Patented Apr. 22, 1941

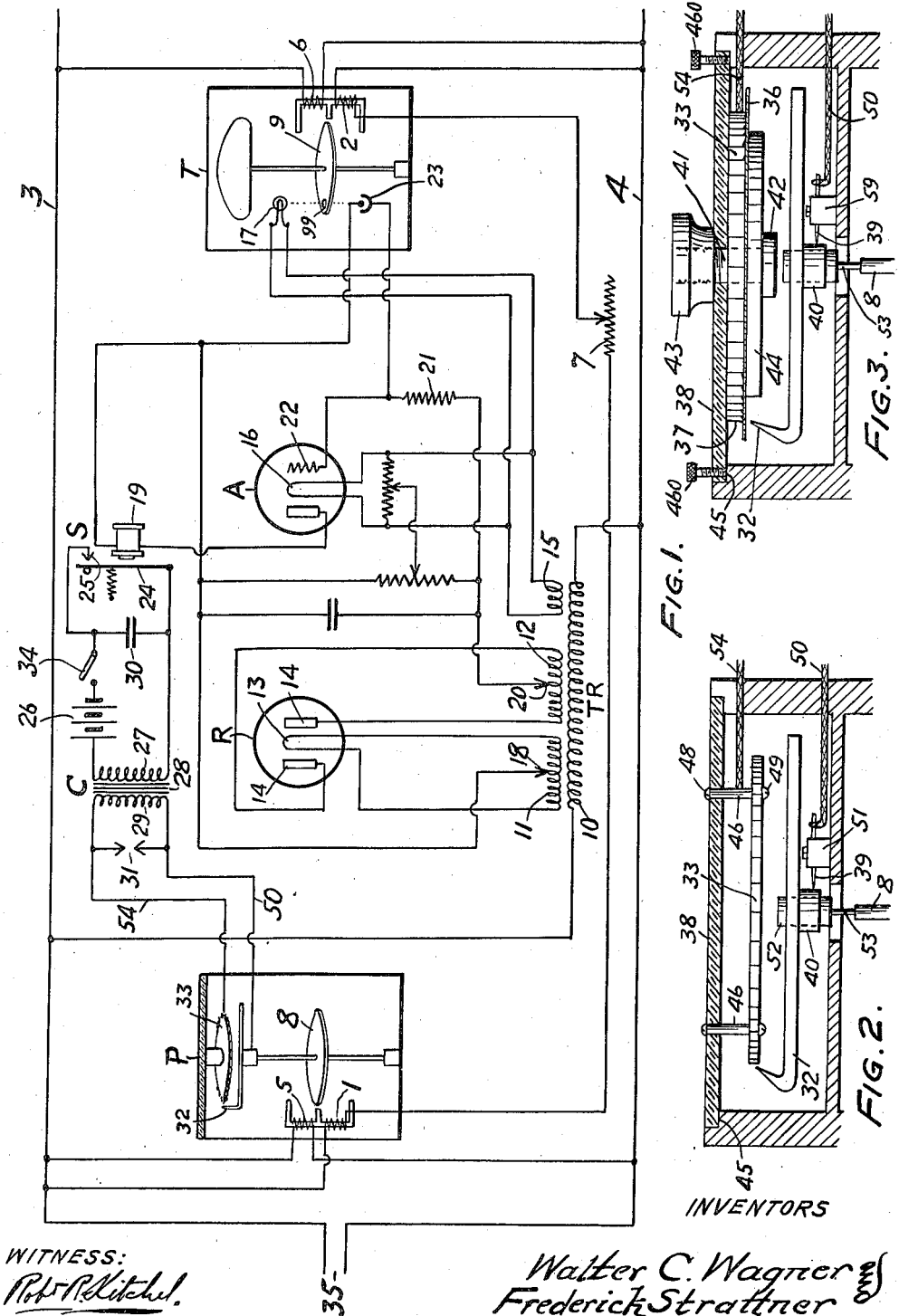

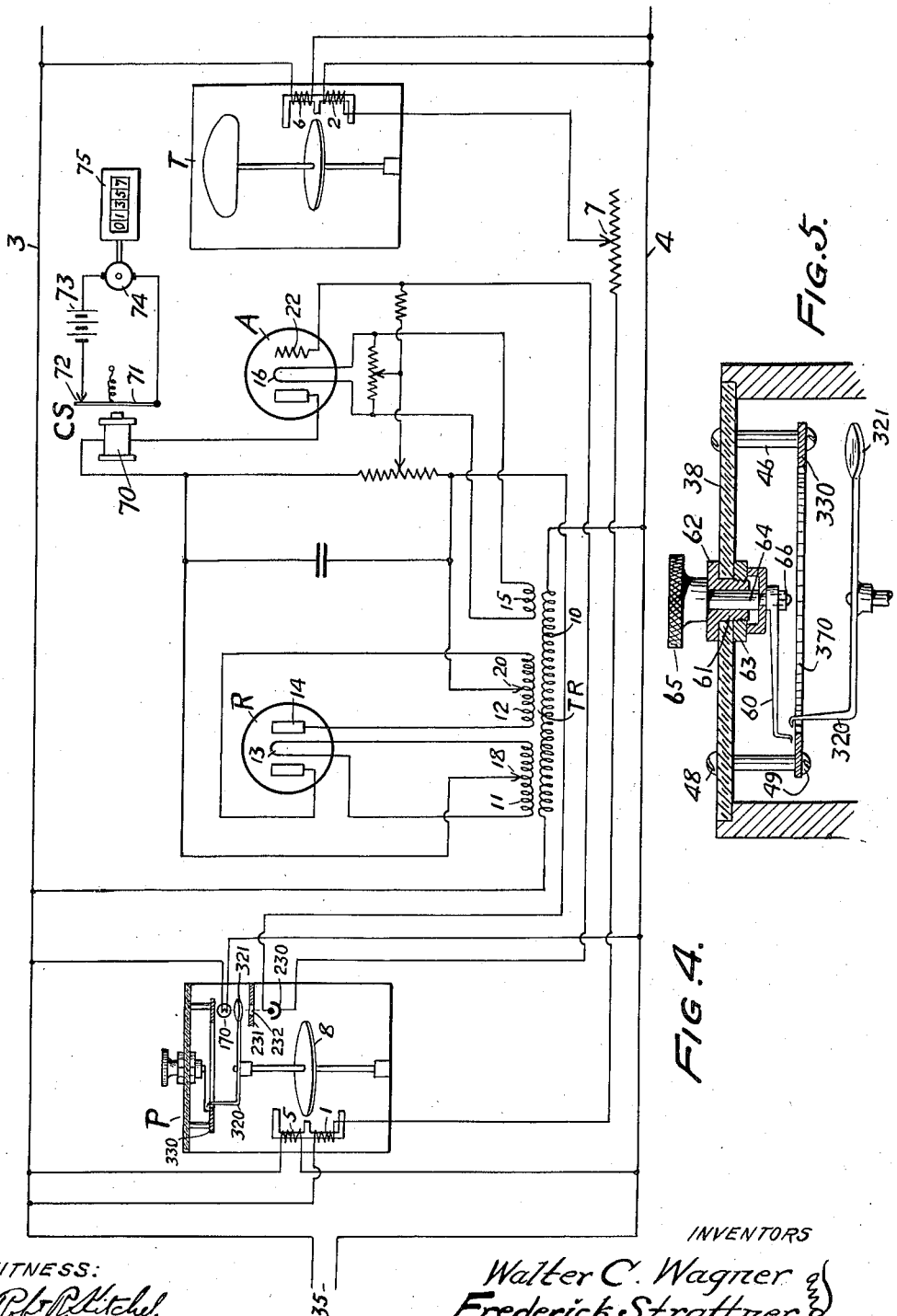

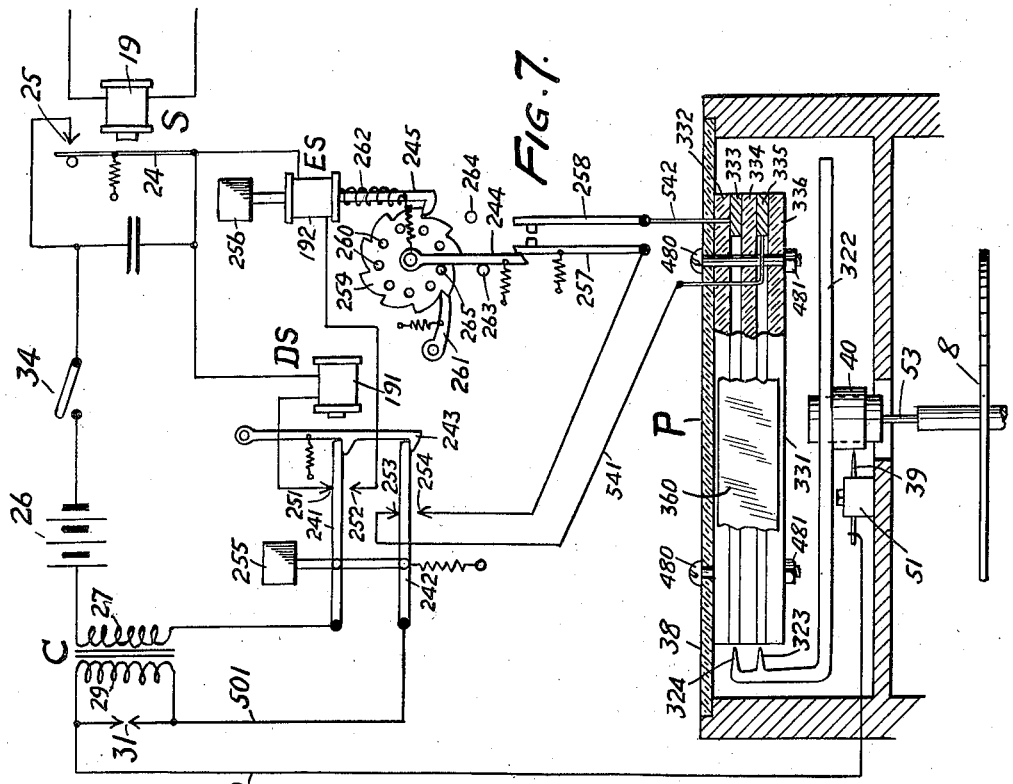
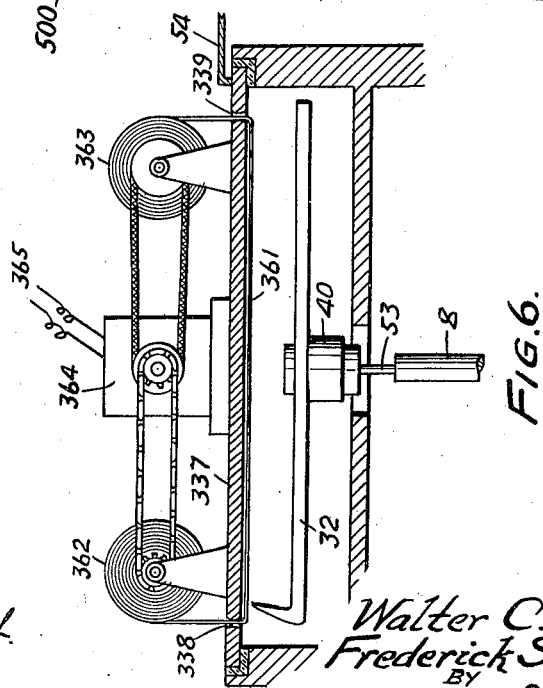

2,239,306

UNITED STATES PATENT OFFICE 2,239,306

PRECISION-CALIBRATING DEVICE WITH VISUAL INDICATOR

Walter C. Wagner, Ardmore, and Frederick Strattner, Upper Darby, Pa.

Application May 2, 1939, Serial No. 271,360

10 Claims. (Cl. 175—183)

An object of our invention is to provide a precision-calibrating device adapted for comparing the speeds of two moving objects.

More specifically, one feature of our invention is to provide means for testing watthour meters by comparing the meter to be tested with a standard meter.

By the provision of our novel device, it is possible to make a test without starting or stopping either the commercial meter which is to be tested or the standard meter with which the commercial meter to be tested is compared. In other words, the commercial meter to be tested and the standard meter are compared while both are rotating at their normal speeds and adjustments can be made to the commercial meter while it is still moving so that its movement is brought into synchronism with that of the standard meter.

One embodiment of our invention comprises a watthour meter to be tested, a source of light mounted adjacent said meter, a light-sensitive element mounted adjacent said meter and arranged to receive light from said source subject to the influence of a rotating part of said meter which serves to interrupt or partially interrupt or to reflect the light from said source to said light-sensitive element, a standard watthour meter having a rotating element, a pointer mounted on said rotating element of said standard meter, and means for causing said pointer or pointers to give a visual indication, such as an electric spark, synchronously with the variations of the light-sensitive element which are caused by the rotation of the meter to be tested.

As a modification, our device may be provided with means for making a record of the test as by providing a stationary, strip or rotating chart to be punctured by the sparks.

For a further exposition of our invention, reference may be had to the annexed drawings and specification; at the end thereof our invention will be specifically pointed out and claimed.

In the drawings:

Fig. 1 is a diagram of one form of our invention.

Fig 2 is a diagrammatic, vertical cross-section of a portion of the standard meter shown in Fig. 1.

Fig. 3 is a diagrammatic, vertical cross-section of a portion of a modified form of standard meter adapted to make a record.

Fig. 4 is a diagram of a second modification of our invention.

Fig. 5 is a diagrammatic, vertical cross-section of a portion of a standard meter shown in Fig. 4.

Fig. 6 is a vertical cross-section of a fragment of a third modification.

Fig. 7 is a diagram of a portion of a circuit and a vertical cross-section of a fragment of a fourth modification.

In that embodiment of our invention selected from among others for illustration in the drawings and description in the specification, our device is shown as consisting of a precision standard generally indicated at P and a meter generally indicated at T, a rectifying device generally indicated at R, and an amplifier generally indicated at A. The standard meter P and the meter to be tested T are shown as electric watthour meters having their current coils 1 and 2, respectively, connected in series across an alternating current source indicated by the leads 3—4. The potential coils of the meters P and T, which are coils 5 and 6 respectively, are connected directly across the line. An adjustable resistor 7 is connected in series in the circuit containing the current coils 1 and 2 for the purpose of varying the current at which the meters are tested. Meters P and T each has a rotating part shown as 8 and 9, respectively, arranged for rotation by means of the flux produced by the current and potential coils of each meter. Rotating part 9 of meter T has a light-varying element 99 thereon. This may be one of the creep holes customarily found in meters of this type or may be means for completely or partially intercepting or for reflecting the light from any convenient source.

Connected across leads 3—4 is provided a transformer TR having one coil 10 connected across leads 3—4. Transformer TR includes a pair of other coils 11 and 12. Coil 11 is connected to the filament 13 of the rectifier R while coil 12 is connected to the plates 14. The rectifier R is shown as a thermionic full-wave rectifier but may be of any other convenient type. Transformer TR also has another winding 15 across which are connected filament 16 of amplifier A and a light source 17 which co-operates with meter T. Midtap 18 of coil 11 is connected to one side of coil 19 of a relay S and to a light-sensitive element 23, while midtap 20 of coil 12 is connected through resistor 21 with grid 22 of amplifier A and to said light-sensitive element 23, which may be a photo-electric cell and which co-operates with meter T. Light source 17 and light-sensitive element 23 may either or both be provided with a suitable optical system for concentrating and condensing the light. Coil 19 operates switch blade 24 which co-operates with stationary switch contact 25. Switch blade 24 is biased towards open position out of contact with 25. In series with switch 24—25 is connected a battery 26 and the low-tension coil 27 of a spark coil C having a core 28 and a high-tension coil 29. Condenser 30 is connected across the low-tension of the spark coil while a safety gap 31 is connected across the high-tension side of the spark coil. One side of coil 29 is connected to a pointer 32 as is best seen in Fig. 2 by means of an adjustable point 39 adapted to pass a spark to ring 40 or similar device. Pointer 32 forms part of the rotating element 8 of meter P. The other side of coil 29 is connected to a stationary element 33 of meter P. Stationary element 33 is shown as consisting of a disk having serrations or saw teeth on it. Spaced apart and closely adjacent thereto the pointed end of pointer 32 rotates. If desired, indicia may be provided on stationary element 33, as by markings or by giving the teeth or serrations different colors. A manually operable switch 34 controls the closing of the circuit containing the relay S and spark coil C. If desired, a plug or lead-in device may be used to provide for connecting the device into circuit, particularly when the device is used as a portable device for testing meters in customers' premises.

As is shown in more complete detail in Fig. 2, the casing of meter P is provided at its top with a shoulder 45 which serves to center and support a plate 38 of glass or similar transparent, insulating material. From plate 38 is suspended stationary element 33 as by tubes 46 having internal screw-threads into which bolts 48 and 49 fit. A lead-in wire 50 conducts current to an adjustable spark gap element 39 mounted in a block of insulation 51 so as to be adjacent to a ring 40 of brass or the like which is mounted on a thimble 52 of insulating material carried on a needle 53 forming part of rotating element 8. Thimble 52 carries pointer 32 and metallic contact is provided between ring 40 and pointer 32. A lead-in 54 connects to stationary element 33 by means of one of the tubes 46 or in any other convenient manner.

The operation of our device is as follows: The light source 17 is mounted adjacent meter T, which is the meter to be tested, so that the light from source 17 falls upon the light-influencing element 99, which is shown as a hole in the meter disk. The light-sensitive element 23 is mounted adjacent meter T so as to receive light from light source 17 as influenced by the movement of the rotating part 9 of meter T. Plug 35 is connected to any suitable source of current and the meters T and P rotate, having their current coils 1 and 2 connected in series, at a speed controlled by resistor 7. When it is desired to commence the test, switch 34 is closed and the next time the light-influencing element 99 is aligned with the beam of light passing from light source 17 to light-sensitive element 23, a variation is caused in the light-sensitive element, which passes through amplifier A and influences relay S, causing momentary engagement of the relay contacts 24 and 25.

This causes a spark to pass between pointer 32 and that tooth of stationary element 33 to which the pointer is adjacent. If the meters P and T are rotating at the same speed, this spark always occurs at the same tooth or place but, if the meters P and T are rotating at different speeds, this spark appears to progress or retrogress about stationary element 33, depending upon the relative speeds of the two meters. By observing the travel of successive sparks or other visual indications, corrections during such operations can be made to meter T to bring it into synchronism with meter P.

If it is desired to make a record of the relative speeds of meters P and T, a device such as is shown in Fig. 3 is employed. In this modification, the meter P has a stationary or moving record-receiving means such as a disk of paper 36 placed between pointer 32 and stationary element 33 which, in this case, is detachable from meter P and has serrations which may conveniently take the shape of sharp ridges or teeth or points 37 around the edge of stationary element 33. Pointer 32 and stationary element 33 are mounted on a plate 38 of electrical insulation such as glass by means of screw 41 having a flanged head 42 co-operating with a knurled nut 43 and a washer 44 to clamp the record-receiving means 36 in position. Plate 38 is centered relative to pointer 32 by shoulders 45 on the casing of meter P and is adjustable in height relative to pointer 32 by means of leveling screws 460 so as to vary the spark gap between pointer 32 and stationary element 33. Pointer 32 and stationary element 33 are adjusted so as to cause the sparks to strike directly through the record-receiving means 36 to teeth or points 37 of stationary element 33. There is thus produced in the record-receiving means 36 a series of holes or other markers following the shape of an arc. The first two or more of these to be made are observed and it is thus shown, whether or not the meters P and T are in synchronism and, if they are not, what are the variations in direction and amount of their relative speeds.

Instead of the element 33 being a serrated or toothed disk as illustrated in Fig. 3, it may be a plane disk or plate having a smooth rim. This would be the equivalent of substituting an infinite number of points for the finite number of teeth and permit considerably increased accuracy of calibration.

In the foregoing, meters P and T have been described as having the same watthour-per-disk-revolution constant, but it is to be understood that the method applies with equal effect when these constants differ. In such case the pointer 32 will not be adjacent to the same tooth of stationary element 33 for successive revolutions of element 9 when meter T is without error, but the spacing of successive sparks will be proportionate to said constant. For convenience in testing in the latter case, it is necessary merely to permit revolution of element 9 until a spark occurs at a tooth previously sparked. Since meter constants are generally small whole numbers, this is a simple matter.

Although the embodiment which has been illustrated and described refers to the testing of electric watthour meters, our invention in its broader aspect includes the comparison of relative degree of movement in a given interval or speed of any bodies, devices or elements having a repeating cycle of movements.

Another modification of our invention is shown in Figs. 4 and 5. It consists of the addition of a gearless counter to the meter P. Fig. 4 shows similar circuit connections to those shown in Fig. 1 with the exception that the light source 170 and the light-sensitive element 230 are mounted adjacent meter P, the light-sensitive element 230 being enclosed in a housing 231 having an aperture 232 therein. Pointer 320 is provided with a target or other light-intercepting means 321 at its opposite end from the pointer. As is best seen in Fig. 5, stationary element 330 is in the form of a ring having serrations or points 370 on its inner edge, if desired, and mounted by tubes 46 having internal screw-threads into which bolts 48 and 49 fit. Co-operating with stationary element 330 is a manually movable pointer 60 which is mounted on cover 38 by means of a screw 61 having a flat head 62 and on which is mounted a threaded washer 63. Through screw 61 projects a bolt 64 having a knurled head 65 and to the lower end of which pointer 60 is attached by means of a nut 66.

As is shown in Fig. 4, light source 170 is connected directly across the alternating current leads 3 and 4, while light-sensitive element 230 is connected across the output from rectifier R and the grid 22 of amplifier A in such a manner as to control the coil 70 of relay CS, which has an armature blade 71 biased towards stationary contact 72 in a circuit containing a source of energy 73 and a motor 74 which operates counter 75. The remaining elements of the circuit are similar to those shown in Fig. 1.

The operation of this modification of our device is as follows: The manually adjustable pointer 60 is set by hand into alignment with pointer 320. The meters P and T are set in rotation by closing any switch, connecting them to a source of current such as by plugging in connection 35. The operator counts the desired number of revolutions of the rotating part of meter T. Each revolution of meter P causes target 321 to intercept the beam of light passing from light source 170 to light-sensitive element 230 and thereby causes coil 70 to attract blade 71 and thereby break contact between 71 and 72 and thus cause motor 74 to operate counter 75 one digit. The operator is thus afforded an accurate check of the number of revolutions of meter P without the necessity of giving his attention to them.

The relative speeds of meters P and T may also be recorded on a strip chart as shown in Fig. 6. In this modification, the insulating plate 38 is replaced by a metallic plate 337 which is insulated from the meter housing, is provided with slots 338 and 339, and has mounted on its upper surface chart rollers 362 and 363 in such manner that a strip chart 361 may be threaded through said slots, unrolled from one of said rollers 362 and rolled on the other. An electric motor 364, suitably energized by means of leads 365, is also mounted on plate 337 and is arranged to drive rollers 362 and 363 so that chart 361 is held in juxtaposition to the lower surface of plate 337. In this modification, lead 54 is in metallic contact with plate 337. In the operation of this device, if the sparks are made successively at the same angular position of pointer 32, a line of holes will appear on the chart 361 as the chart moves. Any differences in relative speeds are indicated by the position of the spark holes. The chart 361 may be a narrow strip or may be made as wide as is desired.

A further modification of our invention for recording relative speeds of meters P and T is shown in Fig. 7. In this device, the element 33 is replaced by a cylindrical element 331 designed to hold a cylindrical chart 360. The pointer 32 is replaced by a pointer 322 having a bifurcated tip with sparking points 323 and 324. Element 331 is composed of three disks 332, 334 and 336 of insulating material and two metal rings 333 and 335, ring 333 being fixed between disks 332 and 334 and ring 335 between disks 334 and 336. The element 331 is held together and secured to plate 38 by bolts 480 and nuts 481.

The connection between the low tension coil 27 of spark coil C and the switch blade 24 of relay S is made through one of the switch blades 241, one of the contacts 251 and coil 191 of a double-pole double-throw delayed latched relay DS. The switch blades 241 and 242 of relay DS are biased towards contacts 252 and 254, respectively, but may be manually latched away therefrom and into engagement with contacts 251 and 253 by setting the latch armature 243 which is biased to retain such setting until coil 191 is energized. When coil 191 is energized, latch 243 is operated to release blades 241 and 242 so that they engage contacts 252 and 254 instead of 251 and 253, the action of the biasing spring being delayed by a dashpot 255. One lead 500 of high tension coil 29 is connected to the spark gap element 39. The other lead 501 of high tension coil 29 is connected to the blade 242. The contact 253 is connected to ring 335 by a lead-in wire 541. The function of the relay DS is to switch the high tension circuit from ring 335 immediately after pointer 322 has sparked to ring 335.

A delayed reset ratcheting relay ES is provided to close the high tension circuit through ring 333 after a predetermined number of operations of relay S and to permanently open the high tension circuit immediately after pointer 322 has sparked to ring 333. Relay ES comprises a ratchet wheel 259 provided with a series of holes 260, a biased detent 261 to insure unidirectional rotation of wheel 259, a solenoid 192, a hooked armature 245 adapted to be advanced when solenoid 192 is energized and biased toward wheel 259 so that when advanced the hook engages one of the teeth of wheel 259, armature resetting spring 262, a dashpot 256 for delaying the resetting movement of armature 245, a pair of contacts 257 and 258 biased to be normally open, a contact operating arm 244 pivoted on the axis of wheel 259 and biased out of engagement with contact 257, and stops 263 and 264 to limit the movement of arm 244. A pin 265, which may be inserted in any of the holes 260, is adapted to engage arm 244 as wheel 259 moves in a counter-clockwise direction, movement of said arm forcing engagement of contacts 257 and 258. On further movement of wheel 259, the end of arm 244 slips past the end of contact 257, permitting contacts 257 and 258 to disengage, this operation being such that said contacts are engaged for only one ratchet interval. Movement of wheel 259 occurs during the resetting movement of armature 245 after relay S has been de-energized. The coil 192 of relay ES is between contact 252 and blade 24. Contact 254 is electrically connected to contact 257 and contact 258 is connected to ring 333 via lead-in wire 542.

The operation of this device is as follows: When it is desired to commence the test, relay DS is set into latched position; pin 265 is placed in one of the holes 260 corresponding to the desired number of revolutions of element 9, and switch 34 is closed. The next time thereafter that the light-influencing element 99 (Fig. 1) is aligned with the beam of light passing from light source 17 to light-sensitive element 23 causing momentary engagement of contacts 24 and 25, a spark passes between sparking point 323 and ring 335, making a hole in chart 360 indicating the relative momentary angular position of pointer 322 and corresponding in position to the location of ring 335.

The engagement of blade 24 with contact 25 energizes coil 191 of relay DS and trips latch 243, whereupon biased blades 241 and 242, retarded by dashpot 255, move slowly out of engagement with contacts 251 and 253, respectively, and finally engage contacts 252 and 254, respectively. On the next aligning of the light beam with the light-sensitive element 23, the low tension circuit including coil 192 is momentarily energized and wheel 259 is advanced one tooth on the resetting stroke of armature 245. Wheel 259 is advanced until pin 265 mechanically engages arm 244 and causes engagement of contacts 257 and 258, closing the high tension circuit through ring 333. On the next impulse, a high tension discharge occurs, making a spark hole in the cylindrical chart 360 corresponding to the axial position of ring 333. At the same instant, coil 192 is de-energized, permitting armature 245, which has advanced to engage the next tooth of wheel 259, to be retracted by spring 262. Wheel 259 advances and moves arm 244 out of engagement with contact 257, thereby opening the high tension circuit. The stop 264 prevents further movement of arm 244 and wheel 259.

Chart 360 will have two spark holes at axial positions corresponding to the position of rings 335 and 333, indicating, respectively, the beginning and end of the test, the relative circumferential positions of the two spark holes being a measure of the relative speeds of meters P and T.

If it is desired to record a number of successive sparks to ring 333, armature 245 may be blocked in the advanced position and wheel 259 and arm 244 set to hold contacts 257 and 258 in engagement, or relay ES may be replaced by an ordinary single-pole single-throw switch connecting lead 542 to contact 254, in which case the contact 252 would be connected directly to blade 24.

Although the laminar element 331 has been described as composed of conducting rings between disk insulators, this is but one of a number of different forms which have been used, it having been found equally effective to replace rings 333 and 335 by wires laid in annular grooves in a solid cylinder of insulating material.

We do not intend to be limited save as the scope of the prior art and of the attached claims may be required.

We claim:

1. Means for testing an electric watthour meter by comparing it with a standard meter, comprising, an electric watthour meter to be tested, a source of light mounted adjacent said meter, a light-sensitive element mounted adjacent said meter and arranged to receive light from said source subject to the influence of a rotating part of said meter, a standard watthour meter having a rotating element, a pointer mounted on said rotating element of said standard meter, an element mounted in said standard meter and past which said pointer travels, and an electric circuit including said light-sensitive element and said pointer and said element and containing an electric device adapted to cause a spark to pass between said pointer and said element in synchronism with the variations of said light-sensitive element caused by the rotation of the meter to be tested.

2. Means for testing an electric watthour meter by comparing it with a standard meter, comprising, an electric watthour meter to be tested, a source of light mounted adjacent said meter, a light-sensitive element mounted adjacent said meter and arranged to receive light from said source subject to the influence of a rotating part of said meter, a standard watthour meter having a rotating element, a pointer mounted on said rotating element of said standard meter, an element mounted in said standard meter and past which said pointer travels, and an electric spark puncturable element interposed between said element and said pointer to record the passage of sparks therebetween.

3. Means for testing an electric watthour meter by comparing it with a standard meter comprising, an electric watthour meter to be tested, a standard watthour meter having a rotating element, a source of light mounted adjacent said standard meter, a light-sensitive element mounted adjacent said standard meter and arranged to receive light from said source subject to the influence of a rotating part of said standard meter, a counter subject to the influence of said light-sensitive element and arranged to indicate the number of actuations of said light-sensitive element caused by the rotation of said standard meter, and a manually operable pointer mounted adjacent said rotating element of said standard meter and movable manually relative thereto and into alignment therewith to mark the beginning and end of tests.

4. Means for testing an electric watthour meter by comparing it with a standard meter, comprising, an electric watthour meter to be tested, a source of light mounted adjacent said meter, a light-sensitive element mounted adjacent said meter and arranged to receive light from said source subject to the influence of a rotating part of said meter, a standard watthour meter having a rotating element, a first record-making means mounted so as to be rotated by said standard meter, a second record-making means mounted so as to be rotated by said standard meter at a fixed ratio to said first record-making means, record-receiving means co-operating with both said record-making means to receive distinctive records therefrom, means connecting both said record-making means under the influence of said light-sensitive element so that said record-making means record when said light-sensitive element is influenced due to the rotation of said meter to be tested, and a switch forming a part of said last-mentioned means operable to connect one or other of said record-making means under the influence of said light-sensitive element.

5. Means for testing an electric watthour meter by comparing it with a standard meter, comprising, an electric watthour meter to be tested, a source of light mounted adjacent said meter, a light-sensitive element mounted adjacent said meter and arranged to receive light from said source subject to the influence of a rotating part of said meter, a standard watthour meter having a rotating element, a record-making means mounted so as to be rotated by said standard meter, a record-receiving means co-operating with said record-making means to receive a record made by said record-making means, a step-by-step motor connected under the influence of said light-sensitive element so as to be moved one step each time said light-sensitive element is influenced by said meter, an electric circuit connecting said record-making means under the influence of said light-sensitive element so said record-making means records at certain of the times said light-sensitive element is influenced by said meter, and a switch forming a part of said circuit and arranged to be closed by said motor at one step and to be opened at the next step.

6. A watthour meter testing apparatus adapted to be applied to a commercial meter to be tested and to a standard meter and including, record-making means rotated in synchronism with said standard meter, record-receiving means co-operating with said record-making means to receive a record therefrom, and means actuated by the commercial meter to cause said record-making means to record in synchronism with the revolutions of the commercial meter.

7. A watthour meter testing apparatus adapted to be applied to a commercial meter to be tested and to a standard meter and including, a first and a second record-making means rotated in synchronism with said standard meter, a first and a second record-receiving means co-operating respectively with said first and said second record-making means to receive records therefrom, and means actuated by the commercial meter to cause said first record-making means to record when the disk of said commercial meter rotates past a reference position and then to cause said second record-making means to record after a predetermined rotational travel of said disk.

8. A watthour meter testing apparatus adapted to be applied to a commercial meter to be tested and to a standard meter and including, a first and a second record-making means rotated in synchronism with said standard meter, record-receiving means co-operating with said record-making means to receive a distinctive record from each, and means actuated by the commercial meter to cause said first record-making means to record when the disk of said commercial meter rotates past a reference position and then to cause said second record-making means to record after a predetermined rotational travel of said disk.

9. The invention set forth in claim 8 characterized in that said apparatus includes control means independent of the rotation of the commercial meter for rendering said means actuated by the commercial meter effective for causing the record-making means to record.

10. Means for comparing the speeds of a commercial meter to be tested and a standard meter while said meters are rotating at their normal speeds comprising, in combination, a source of electricity, a commercial meter to be tested connected across said source, a standard meter connected across said source, a pointer mounted on said standard meter so as to be rotated in synchronism therewith, a stationary serrated element forming a part of said standard meter and past which said pointer rotates, and an electric device connected under the control of said commercial meter to cause an intermittent discharge between said pointer and the adjacent serration of said stationary element in synchronism with the revolutions of the commercial meter.

WALTER C. WAGNER.
FREDERICK STRATTNER.